(12) United States Patent
Brewer et al.

(10) Patent No.: US 6,997,524 B2
(45) Date of Patent: Feb. 14, 2006

(54) SYSTEM AND METHOD FOR CONTROLLING A HYDRAULIC SYSTEM

(75) Inventors: Michael Edward Brewer, Royal Oak, MI (US); Todd Allen Brown, Dearborn, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 10/250,293

(22) Filed: Jun. 20, 2003

(65) Prior Publication Data

US 2004/0164609 A1    Aug. 26, 2004

Related U.S. Application Data

(60) Provisional application No. 60/449,962, filed on Feb. 26, 2003.

(51) Int. Cl.
*B60T 8/36* (2006.01)
*G05D 11/00* (2006.01)

(52) U.S. Cl. .............. 303/119.1; 303/156; 303/113.1; 137/110

(58) Field of Classification Search ............. 303/156, 303/113.1, 113.2, 119.1, 119.2, 116.1, 68, 303/69; 137/110, 601.18
See application file for complete search history.

(56) References Cited

U.S. PATENT DOCUMENTS

| | | | |
|---|---|---|---|
| 4,294,113 A | * | 10/1981 | Sprott et al. ............. 73/199 |
| 4,950,028 A | | 8/1990 | Harrison |
| 5,015,045 A | | 5/1991 | Nishii |
| 5,137,339 A | | 8/1992 | Brown |
| 5,407,257 A | | 4/1995 | Iwata |
| 6,161,903 A | | 12/2000 | Dieringer |
| 6,227,627 B1 | | 5/2001 | Goossens |
| 6,276,136 B1 | | 8/2001 | Oishi et al. |
| 6,302,497 B1 | | 10/2001 | Takayama |
| 6,345,869 B1 | | 2/2002 | Matsuo et al. |
| 6,419,329 B1 | | 7/2002 | Buschmann et al. |
| 6,450,589 B1 | | 9/2002 | Dieringer et al. |

FOREIGN PATENT DOCUMENTS

| | | |
|---|---|---|
| GB | 2 002 075 A | 2/1979 |
| GB | 2 364 356 A | 1/2002 |
| JP | 6-247272 | 9/1994 |
| JP | 10-181561 | 7/1998 |

* cited by examiner

*Primary Examiner*—Xuan Lan Nguyen
(74) *Attorney, Agent, or Firm*—Raymond L. Coppiellie; Brooks & Kushman P.C.

(57) ABSTRACT

A method for preventing a valve orifice from switching to the small size when a high build gradient is required includes briefly bleeding off a small amount of fluid at the upstream side of the valve. This momentarily reduces the pressure difference when beginning the pressure build. After the valve is opened with the large orifice, the fluid flow through the valve prevents a high pressure difference. The resulting build with the large orifice has the maximum pressure gradient.

4 Claims, 5 Drawing Sheets

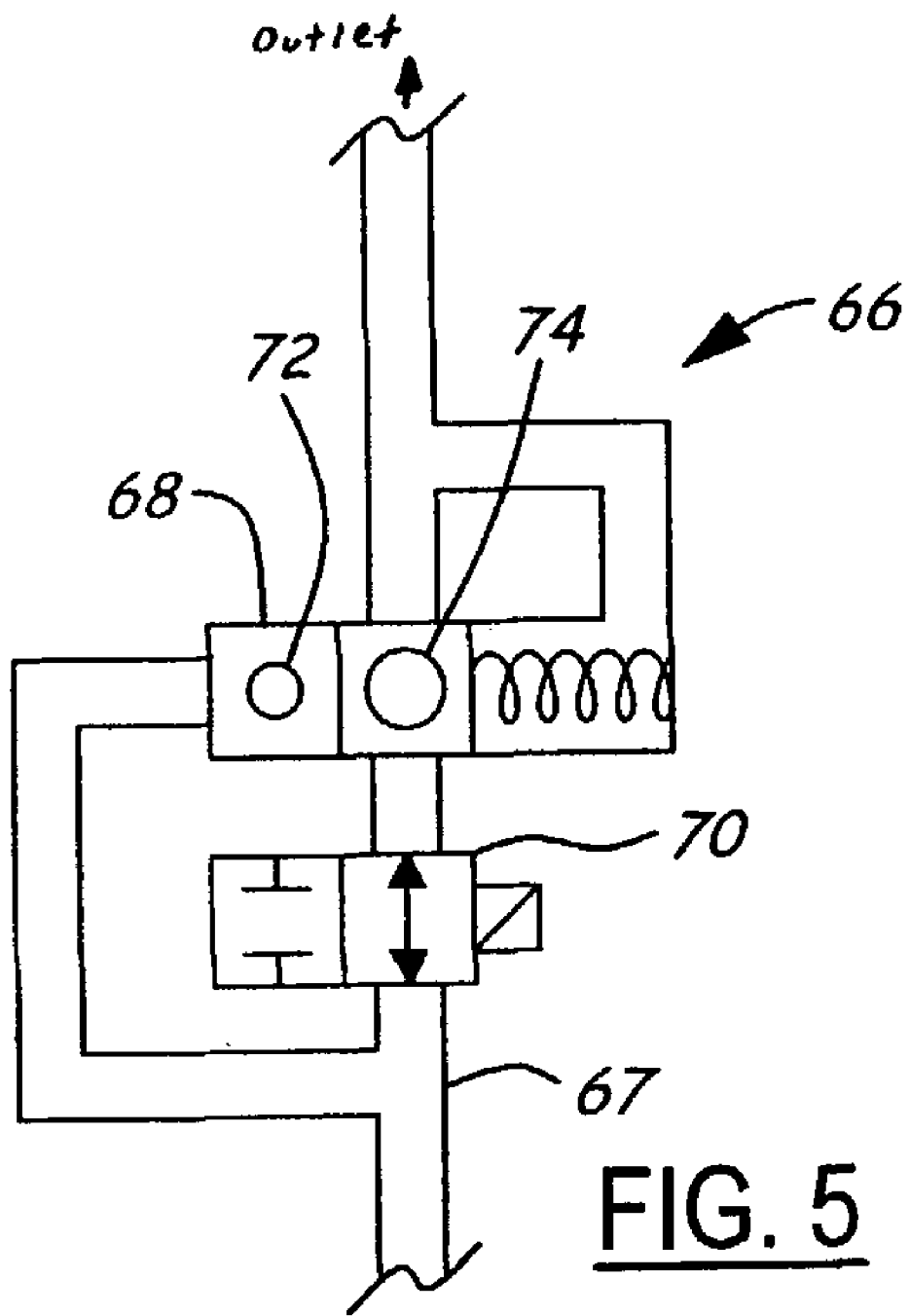

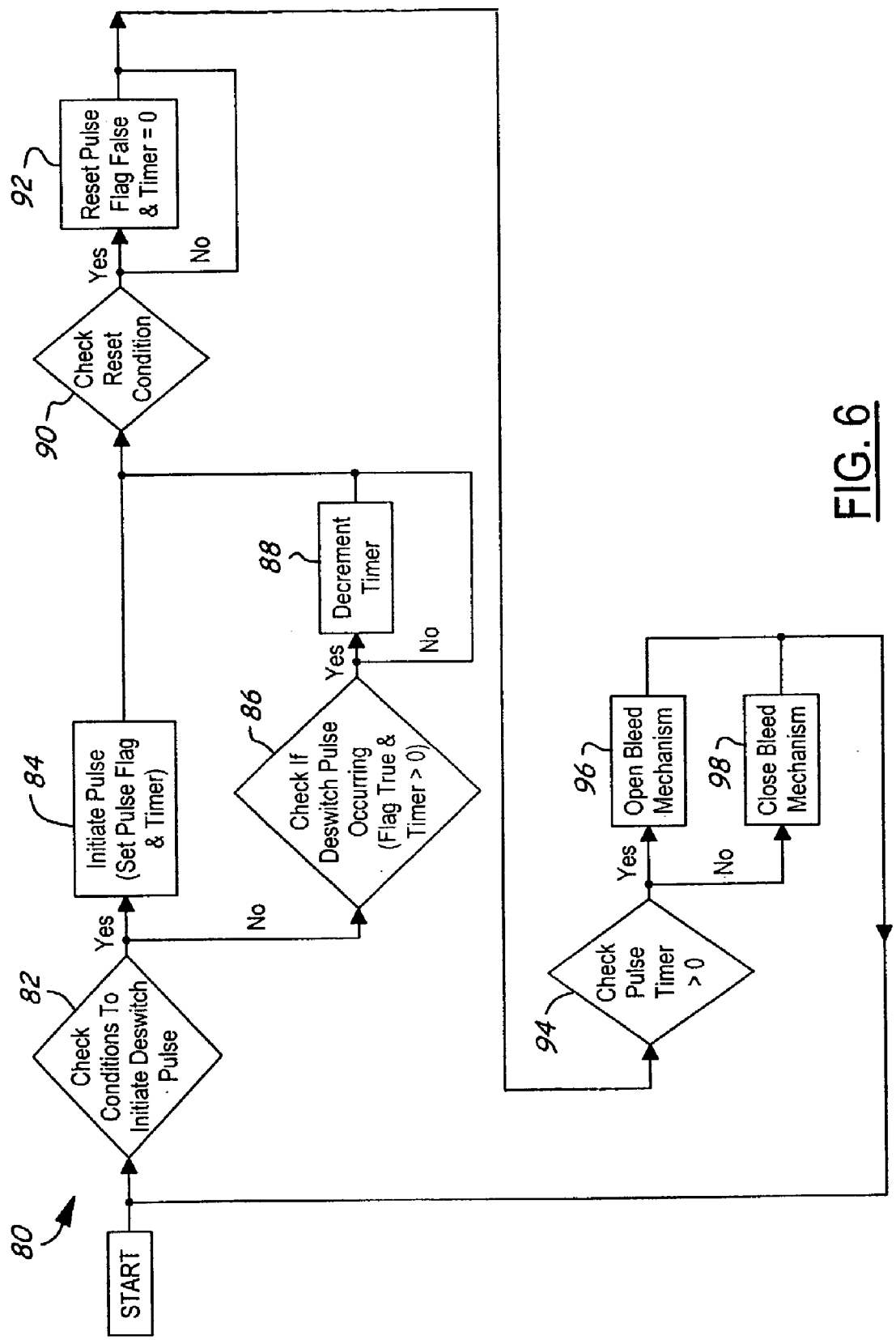

SYSTEM AND METHOD FOR CONTROLLING A HYDRAULIC SYSTEM

CROSS REFERENCE TO RELATED APPLICATIONS

The present invention claims priority to provisional application No. 60/449,962 filed on Feb. 26, 2003.

BACKGROUND OF INVENTION

The present invention relates generally to hydraulic systems, and more specifically, to a method and apparatus for hydraulic control in an automobile braking system.

For hydraulic systems, forces and velocities are transmitted and controlled by transmitting and controlling fluid pressure and flow in a closed system. Pressure in hydraulic systems is calculated through the equation p=F/A, where p is pressure (psi), F is force (pounds), and A is area (square inches).

Hydraulic systems are currently used in a variety of control systems, such as automobile braking systems.

In typical braking systems, a hydraulic pressure generator (main cylinder) generates a braking pressure through hydraulic fluid lines in response to depression of a brake pedal, thereby operating a braking device mounted on each tire.

For hydraulic control systems, such as rollover stability control (RSC) using the aforementioned braking systems, fast rates of pressure buildup are desirable. For RSC systems, an RSC designated control wheel must have a high pressure build gradient.

To control pressure, the brake unit also includes tire sensors and electronic switching circuits for detection and monitoring of the rotational behavior of the tires and for the generation of electric brake pressure control signals for use in slip and rollover control.

Many hydraulic systems, such as the aforementioned, utilize valves having a switchable orifice size, primarily to improve noise and vibration harshness (NVH). Orifice size or state is typically determined by the pressure difference across one of the valves, switching from a large state to a small state in response to a high pressure difference. Pressure activated valve switching has previously not been directly controllable.

It would therefore be desirable to provide a system and method for preventing an orifice from switching from a large state to a small state during large build requests. It would also be desirable to provide a maximum pressure gradient and to provide direct pressure activated valve switching. The present invention is directed to these ends.

SUMMARY OF INVENTION

It is therefore an object of the invention to provide a system for controlling switchable hydraulic valves so that the hydraulic pressure or pressure buildup in such systems may desirably be controlled.

In one aspect of the invention, a hydraulic system includes a fluid line adapted to contain a fluid. A switchable valve is coupled to the fluid line and includes a small orifice and a large orifice. The switchable valve is adapted to switch to the small orifice in response to a high pressure difference across the valve. The switchable valve is further adapted to switch to the large orifice in response to a low pressure difference across the valve. A controller is adapted to bleed a portion of the fluid in response to an onset of a pressure build, whereby the valve opens with the large orifice, thereby generating a maximum build gradient.

In a further aspect of the invention, a method for controlling a hydraulic system including a valve having a small orifice and a large orifice includes bleeding off a small amount of a fluid at an upstream side of the valve thereby generating a reduced pressure difference at an onset of a pressure build across the valve. The method also includes opening the large orifice of the valve in response to the reduced pressure difference thereby preventing a high pressure difference across the valve and generating a maximum pressure gradient.

Thus, the present system may be incorporated in a rollover stability control system (RSC). One advantage of the invention is that pressure on the upstream side of the valve at the beginning of an RSC pressure build, may be relieved which causes the orifice to have a large opening during the pressure build.

Other objects and features of the present invention will become apparent when viewed in light of the detailed description of the preferred embodiment and when taken in conjunction with the attached drawings and appended claims.

BRIEF DESCRIPTION OF DRAWINGS

FIG. 5 is a diagrammatic view of a hydraulic system in accordance with another embodiment of the present invention.

FIG. 6 is a logic flow diagram of a method for controlling a switchable hydraulic valve in accordance with another embodiment of the present invention.

DETAILED DESCRIPTION

The present invention is preferably used to maximize hydraulic fluid pressure gradients in automobile braking systems. The present invention, however, may also be used to maximize pressure gradients in various types of hydraulic systems. The present invention is particularly suited for dynamic control systems such as yaw control, rollover stability control (RSC) and the like.

Figure 1:
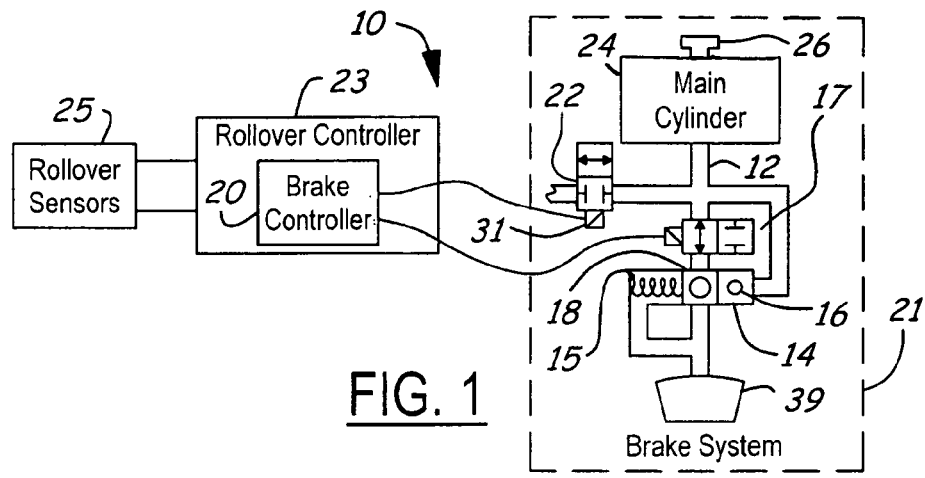
FIG. 1 is a diagrammatic view of a hydraulic system in accordance with one embodiment of the present invention.

Referring to FIG. 1, a hydraulic system 10, including a fluid line 12 containing a hydraulic fluid is illustrated. In the present example, the fluid is brake fluid. The fluid line 12 includes a switchable valve 14 and a control valve 17 for the switchable valve 14, both coupled thereto. The valve 14 includes a small orifice 16 and a large orifice 18.

The system 10 further includes a controller 20 or brake controller. The system 10 also includes various typical hydraulic components of a brake system 21, such as: a valve 39 receiving fluid through the orifice 14, a master or main cylinder 24, coupled to the fluid line 12, and an actuator 26 for the main cylinder 24.

The switchable valve 14 switches to the small orifice 16 in response to fluid flow through the control valve 17 by compressing the valve spring 15 in response to a high pressure difference across the valve 14 and switches to the large orifice 18 in response to a low pressure difference across the valve 14. The large orifice 18 has a larger cross-sectional opening area than the small orifice 16. That is, the small orifice 16 has a smaller cross-sectional area than the large orifice 18.

The hydraulic system 10 further includes the controller 20 electrically coupled to the bleed mechanism 22 or a control valve 31 of the bleed mechanism 22. The controller may be stand-alone or incorporated into a large control system such as a dynamic control system or rollover controller 23, as is illustrated herein. The controller 20 is preferably microprocessor-based and includes logic for bleeding a portion of the fluid in response to an onset of a pressure build through signaling the bleed mechanism 22 in response to signals from, for example, rollover sensors 25. The controller 20 controls the switchable valve 14 to open with the large orifice 18, thereby controlling the switchable valve 14 and generating a maximum build gradient. Functions of the controller 20 will be discussed in detail later.

The fluid line 12 is coupled to the main cylinder 24, which activates in response to the actuator 26 (here embodied as a pedal), and sends increased fluid pressure to the switchable valve 14. The main cylinder 24 may also provide an increase in pressure due to various dynamic control systems of the vehicle 32 wherein the system 10 may be housed.

Figure 2:
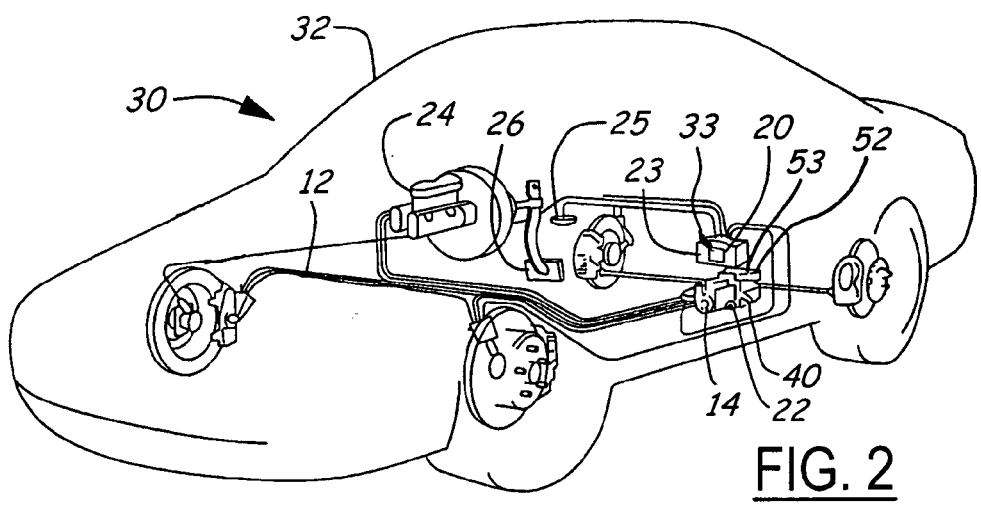
FIG. 2 is a diagrammatic view of a vehicle system in accordance with another embodiment of the present invention.

Referring to FIG. 2, a control system 30 for an automotive vehicle 32 having a fluid line 12 having a switchable valve 14, a first brake bleed mechanism or valve 22, a second brake bleed mechanism or valve 40, rollover sensors 25 (sensor cluster), and a brake controller 20 within a rollover controller 23, is illustrated. The system 30 also includes a main cylinder 24, a brake pedal 26, and third and optionally fourth bleed mechanisms 52, 53.

The control system 30 includes the fluid line 12 coupled to the switchable valve 14, the first brake bleed mechanism 22, and the second brake bleed mechanism 40. The control system 30 also includes the controller 20 for controlling the switchable valve 14 through signaling the bleed mechanisms or valves 22, 40. The controller 20 generates signals in response to braking signals from the brake pedal 26 received in the main cylinder 24 and from RSC events or other stability or vehicle control events sensed by the sensors 25.

The system 30 includes at least one typical automotive fluid line 12. The fluid line 12 contains a hydraulic fluid and has bleed mechanisms or valves 22, 40 for bleeding a portion of the fluid in response to deswitch signals, as will be discussed later.

The fluid line includes the switchable valve 14 coupled thereto. The switchable valve 14 includes the small orifice 16 and the large orifice 18 described above. The switchable valve 14 switches to the small orifice 16 in response to a high pressure difference across the valve 14 and switches to the large orifice 18 in response to a low pressure difference across the valve 14.

The fluid line 12 also includes bleed mechanisms 22, 40 coupled thereto. The first brake bleed mechanism 22 and the second brake bleed mechanism 40 are embodied as switchable valves or caliper actuators, however, any alternate brake bleed mechanism known in the art is also embodied herein.

In the present embodiment, the switchable valve 14 is the actuator for a first wheel, wherein the first bleed mechanism 22 is the valve for the other wheel on the same brake circuit. A pressure request is made on the other wheel, which is not undergoing a Roll Stability Control (RSC) event, to open the bleed mechanism 22 that bleeds brake fluid from the upstream side of the switchable valve 14.

The bleed mechanisms 22, 40 are electrically coupled to the controller 20 either directly or through actuators. The controller 20 generates the deswitch signal or deswitch flag at a beginning of a pressure build signal thereby relieving pressure on an upstream side of the switchable valve, 14 whereby the switchable valve 14 switches to the large orifice 18 thereby allowing maximum fluid flow through the switchable valve 14.

The length of the controller deswitch signal is controlled by a controller pulse timer 33. The pulse timer 33 is controlled such that the length of the pulse is sufficient to briefly relieve pressure from the upstream side of the valve 14, but is short enough to prevent a significant decrease in pressure on the downstream side of the valve 14. In the present embodiment, this parameter is set to approximately 14 ms.

The controller 20 determines the nature of the control event, such as an RSC control event, through a plurality of vehicle dynamic signals from sensors 25 coupled thereto. The sensors 25 may include roll rate sensors, yaw rate sensors, pitch rate sensors, lateral acceleration sensors, longitudinal acceleration sensors, speed sensors, or any other vehicle dynamic sensors known in the art.

Based upon inputs from the sensors 25, the controller 20 may control a safety device. Depending on the desired sensitivity of the system 30 and various other factors, not all the sensors are used in a commercial embodiment. The safety device may control the hydraulic fluid flow in the fluid line 12, an airbag or a steering actuator or braking actuator at one or more of the wheels of the vehicle 32.

Figure 3:
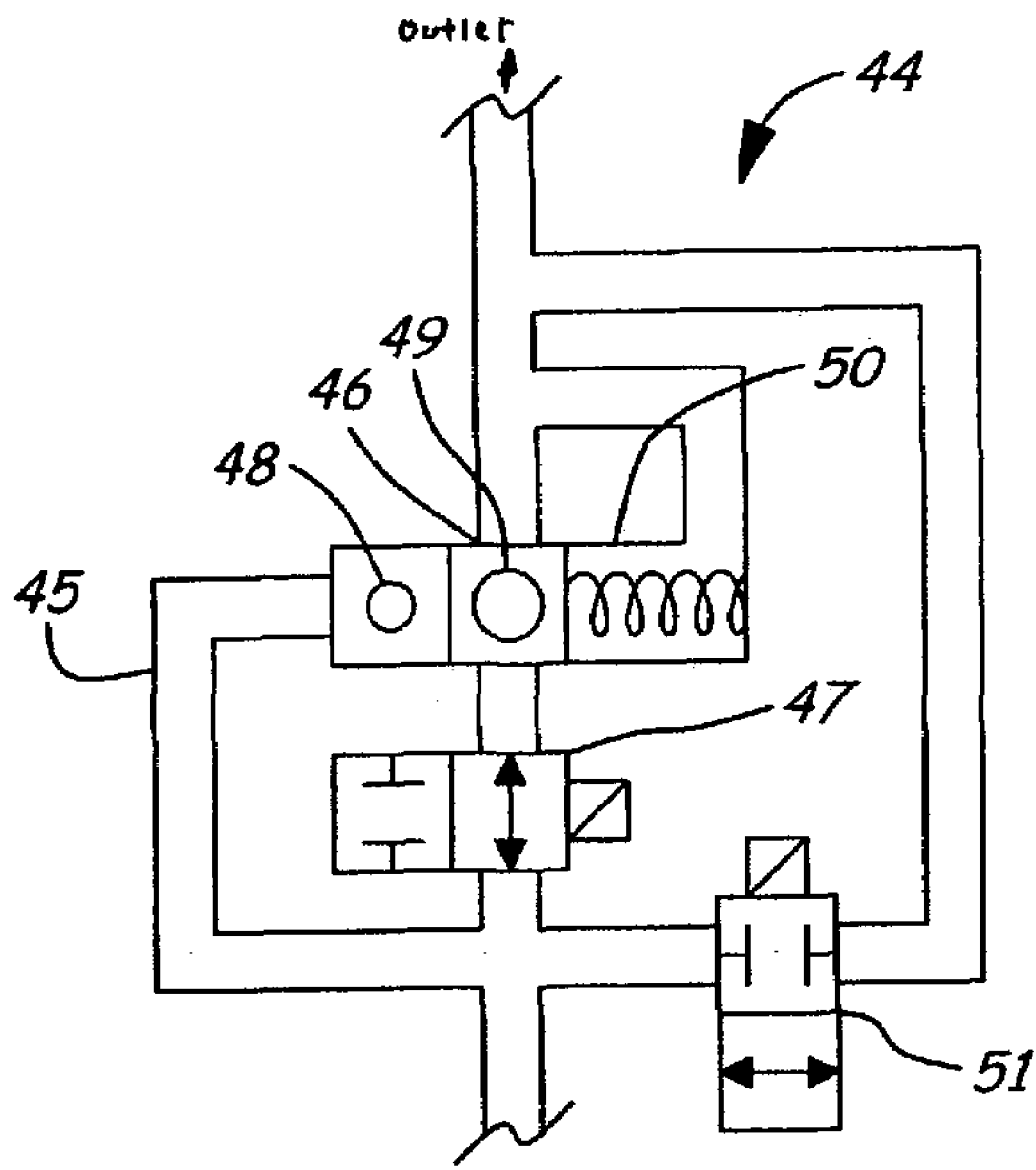
FIG. 3 is a diagrammatic view of a hydraulic system in accordance with another embodiment of the present invention.

Referring to FIG. 3, an alternate embodiment of a hydraulic system 44, in accordance with another embodiment of the present invention, is illustrated. The system 44 also includes a fluid line 45 containing a hydraulic fluid. The fluid line 45 includes a secondary valve port 51, a switchable valve 46, and a control valve 47 for the switchable valve 46, all coupled to the fluid line 45. The valve 46 includes a small orifice 48 and a large orifice 49.

The switchable valve 46 switches to the small orifice 48 in response to fluid flow through the control valve 47 by compressing the valve spring 50 in response to a high pressure difference across the valve 46 and switches to the large orifice 49 in response to a low pressure difference across the valve 46.

In this embodiment, the secondary valve port 51 is activated by a controller to bleed off a portion of the fluid. The fluid then flows out the outlet portion of the fluid line 45, which will typically lead into a caliper or braking mechanism.

Figure 4:
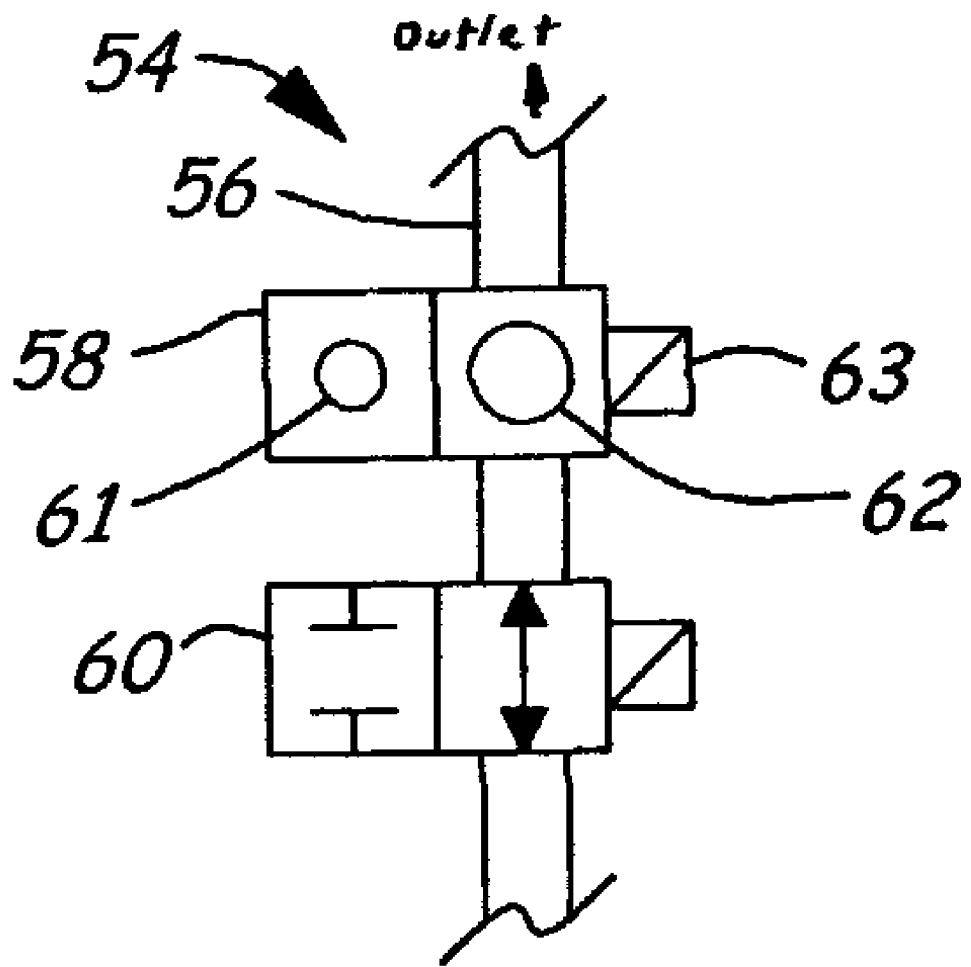
FIG. 4 is a diagrammatic view of a hydraulic system in accordance with another embodiment of the present invention.

Referring to FIG. 4, an alternate embodiment of a hydraulic system 54, in accordance with another embodiment of the present invention, is illustrated. The system 54 includes a fluid line 56 containing a hydraulic fluid. The fluid line 56 includes a switchable valve 58 and a control valve 60 for the switchable valve 58, both coupled thereto. The valve 58 includes a small orifice 61 and a large orifice 62.

For this embodiment, a controller activates the control valve 60 and directly controls the switchable valve 58 through a control device 63, such as a solenoid, coupled to the valve 58. In this embodiment, fluid is not bled off; the controller merely selects the large or small orifice to generate a maximum pressure build by generating a valve control signal.

Referring to FIG. 5, an alternate embodiment of a hydraulic system 66 is illustrated. The hydraulic system 66 includes a fluid line 67 containing a hydraulic fluid. The fluid line 67 includes a switchable 68 and a control valve 70 for the switchable valve 68, both coupled thereto. The valve 68 includes a small orifice 72 and a large orifice 74.

This embodiment allows pressure based switching under normal operation, while overriding it during a RSC event to switch to the larger orifice 74. In other words, the controller generates a valve control signal during an RSC event while allowing normal valve switching the rest of the time. Alternatively, the valve 68 could be directly controlled at all times.

Referring to FIGS. 1, 2, and 6, one example of a logic flow diagram for controlling hydraulic fluid in the fluid line 12 from FIG. 2 is illustrated.

Logic starts in inquiry block 82 where a check is made whether conditions require a deswitch pulse initiation. For a positive response, operation block 84 activates, and the deswitch pulse is initiated. This includes setting a deswitch flag and pulse timer 33.

Otherwise, in inquiry block 86, a check is made as to whether the deswitch pulse is already occurring. For a positive response, in operation block 88, the pulse timer 33 is decremented. Inquiry block 90 activates in response to a signal from operation blocks 84, 88 or a negative response to inquiry block 86.

In inquiry block 90, a check is made whether reset conditions exist for the system. For a positive response, in operation block 92, the deswitch flag and the timer 33 are reset.

Otherwise, in response to operation block 92 or a negative response to inquiry block 90, a check is made in inquiry block 94 whether the pulse timer signal is greater than zero. For a positive response, in operation block 96, the bleed mechanism 22 is opened. Otherwise, in operation block 98, the bleed mechanism 22 is closed. The logic flow diagram then returns to inquiry block 82, and logic continues therefrom.

An example of logic for a vehicle controller 30 in accordance with FIG. 6 is included herein below.

Input variables to the following logic include: RQST_R-SC_CTRL (RSC control signals), DRIVER_BRAKING_FLAG (flag set in response to driver braking), AYC_REQ_PRESSURE (required AYC pressure), BRAKE_PRESSR_ESTMT (brake pressure estimate), and PRESSURE_MAIN_CYLINDER (main cylinder pressure).

Output variables include: deswitch, and ctr_Deswitch_PRESSURE (deswitch pressure control). Parameters include: MAX_PRESS_INHIBIT, MAX_DELTAP_FOR_MC, and Deswtitch_Loops (the number of deswitch loops)

The following section of logic determines if RSC pressure build at the front left requires deswitch pulse at the front right wheel:

if(RQST_RSC_CTRL[FL]&&!Deswitch[FR] &&! DRIVER_BRAKING_FLAG&&(AYC_REQ_PRESSURE[FL]>(BRAKE_PRESSR_ESTMT[FL]+MAX_PRESS_INHIBIT)) && (PRESSURE_MAIN_CYLINDER<(MAX(BRAKE_PRESSR_ESTMT[FL], BRAKE_PRESSR_ESTMT[FR])+MAX_DELTAP_FOR_MC)) &&! ctr_Deswitch_PRESSURE[FL]) {Deswitch[FR]=TRUE; ctr_Deswitch_PRESSURE[FR] =Deswtitch_Loops;}

The criteria "&& !ctr_Deswitch_PRESSURE[FL]" below is used to prevent a deswitch pulse on the front left wheel from triggering a deswitch pulse on the front right wheel. This is required because the deswitch pressure request is reflected in the AYC_REQ_PRESSURE.

If the deswitch flag has been set, the deswitch pressure counter (deswitch timer 33) decrements until it reaches zero. This is illustrated by the following logic:else if (Deswitch [FR])if(ctr_Deswitch_PRESSURE [FR])ctr_Deswitch_PRESSURE[FR]--;

The deswitch flag and counter are reset if driver braking occurs or if significant pressure increase is not requested, as is illustrated:

(if Deswitch[FR]&&(DRIVER_BRAKING_FLAG||(AYC_REQ_PRESSURE[FL]<(BRAKE_PRESSR_ESTMT[FL]+MIN_PRESS_INHIBIT)){Deswitch[FR]=FALSE; ctr_Deswitch_PRESSURE[FR]=0;}

The same technique is used for RSC control on the front right wheel by interchanging the subscript values front right (FR) & front left (FL). Also, rear braking may be performed in a similar manner, alone or together with front braking.

Conditions to initiate the deswitch pulse include: pressure build across the valve 14 is requested; pressure build is not keeping up with the request (i.e. in a pressure lag condition—orifice is likely switched to small state.); orifice deswitch through a bleed pulse is feasible (the pressure drop across valve 14 can be sufficiently reduced without impacting control.); the orifice deswitch pulse has not already been performed during the current pressure lag condition; or the orifice deswitch pulse is not currently being performed.

Conditions to reset the deswitch flag and timer 33 include: the pressure build no longer lags the request or driver braking (the pulse is not utilized if significant pressure built by the brake pedal 26 apply.)

In the present embodiment, the pressure lag condition is determined when the pressure estimate for the caliper or brake actuator 22 is lower than the pressure request by at least, for example, 5 bar.

Figure 7:
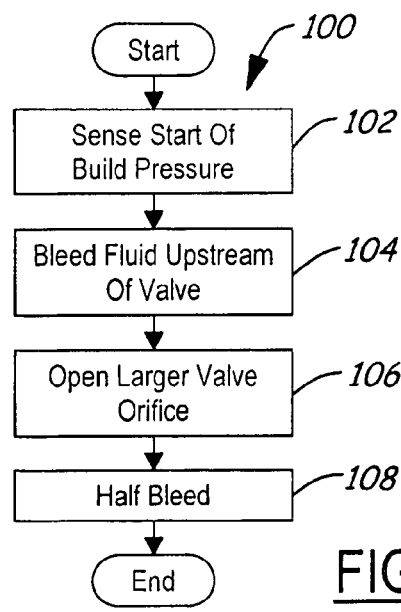
FIG. 7 is a logic flow diagram of a method for controlling a switchable hydraulic valve in accordance with another embodiment of the present invention.

Referring to FIGS. 1, 2, and 7, a logic flow diagram 100 of a method for controlling the hydraulic system 30 including a switchable valve 14 having a small orifice 16 and a large orifice 18 is illustrated.

Logic starts in operation block 102 where a pressure build is sensed within the fluid line 12 at the switchable valve 14.

In operation block 104, fluid is bled within the fluid line 12 through the bleed mechanism 22 upstream of the switchable valve 14.

In operation block 106, the large valve orifice 18 is open in response to the reduced pressure difference at the onset of the pressure build across the switchable valve 14.

In operation block 108, the bleeding of the fluid upstream of the switchable valve 14 is halted after fluid flow is continued through the large valve orifice 18.

In operation, a method for controlling a hydraulic system 30 including a switchable valve 14 having a small orifice 16 and a large orifice 18 includes bleeding off a small amount of a fluid at an upstream side of the valve 14 thereby generating a reduced pressure difference at the beginning of a pressure build across the valve 14. The method further includes opening the large orifice 18 of the valve 14 in response to the reduced pressure difference. This begins a high pressure difference across the valve 14 and generates a maximum pressure gradient.

While particular embodiments of the invention have been shown and described, numerous variations and alternate embodiments will occur to those skilled in the art. Accordingly, it is intended that the invention be limited only in terms of the appended claims.

What is claimed is:

1. A method for controlling a hydraulic system including a valve having a small orifice and a large orifice such that a fluid flows out through the small orifice and the large orifice comprising:
   generating a first pressure difference across the valve;
   bleeding off a small amount of a fluid at an upstream side of the valve thereby generating a pressure difference less than the first pressure difference at an onset of a pressure build across the valve; and
   opening the large orifice of the valve in response to said reduced pressure difference thereby preventing a high pressure difference across the valve and generating a maximum control pressure gradient; and
   generating a deswitch pulse from a controller to activate bleeding of said fluid,
   wherein generating said deswitch pulse further comprises generating said deswitch pulse in response to at least one of a signal that a bleed pulse is feasible and in response to a signal that a pressure drop across the valve can be sufficiently reduced without impacting system control.

2. A method as in claim 1 wherein generating said deswitch pulse further comprises halting said deswitch pulse in response to a signal that sufficient fluid pressure has been bled.

3. A method for controlling a hydraulic system including a valve having a small orifice and a large orifice comprising:
   generating a first pressure difference across the valve;
   bleeding off a small amount of a fluid at an upstream side of the valve thereby generating a pressure difference less than the first pressure difference at an onset of a pressure build across the valve;
   opening the large orifice of the valve in response to said reduced pressure difference thereby preventing a high pressure difference across the valve and generating a maximum control pressure gradient; and
   generating a deawitch pulse from a controller to activate bleeding of said fluid, wherein generating said deswitch pulse comprises generating said deswitch pulse in response to a valve signal corresponding to the small orifice.

4. A method as in claim 3, wherein generating said deswitch pulse further comprises generating said deswitch pulse in response to a valve signal corresponding to a signal generated as a function of conditions indicating that the valve is switched to the small orifice.

* * * * *